R. SERA.
BEET TOPPING AND HARVESTING MACHINE.
APPLICATION FILED JUNE 13, 1918.
1,314,155.
Patented Aug. 26, 1919.
2 SHEETS—SHEET 1.
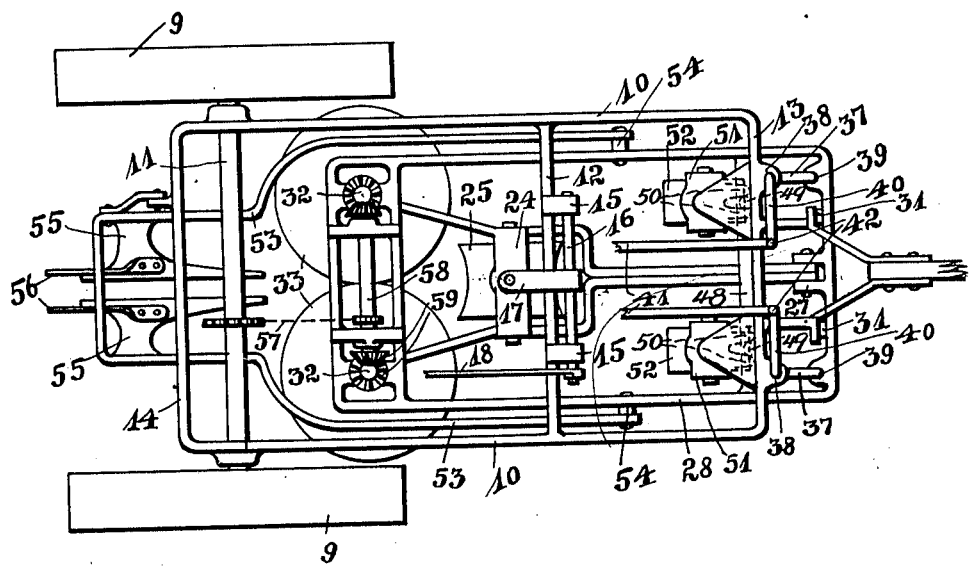
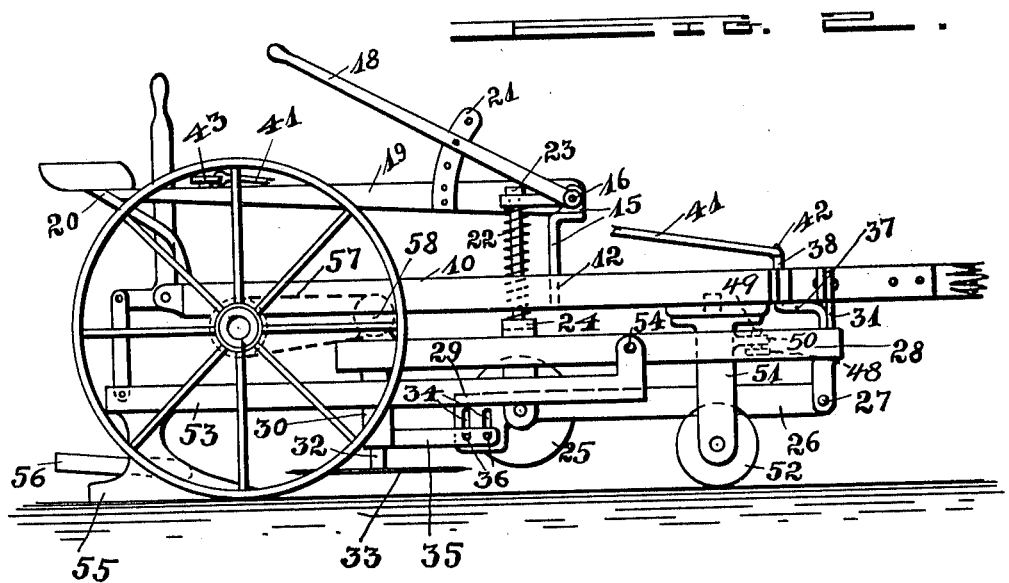
INVENTOR
Ryunosuke Sera
BY
Edward M. Kojima
ATTORNEY R. SERA.
BEET TOPPING AND HARVESTING MACHINE.
APPLICATION FILED JUNE 13, 1918.
1,314,155.
Patented Aug. 26, 1919.
2 SHEETS—SHEET 2.
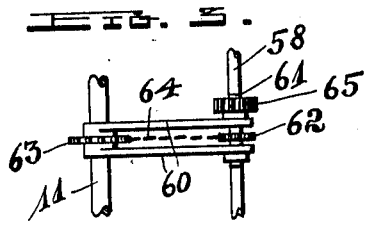
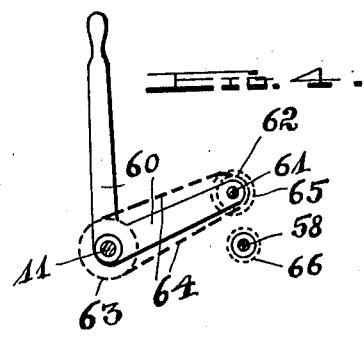
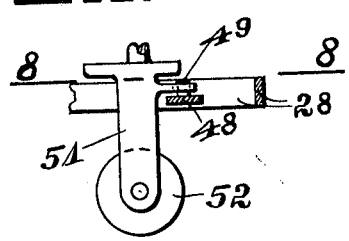
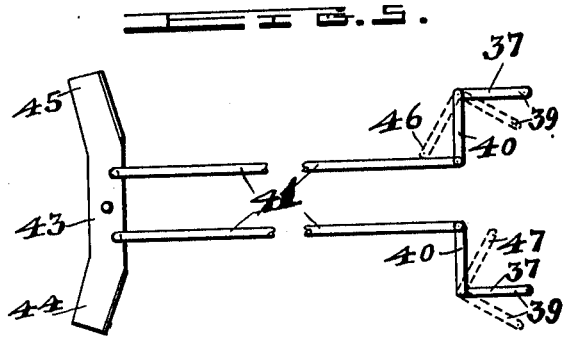
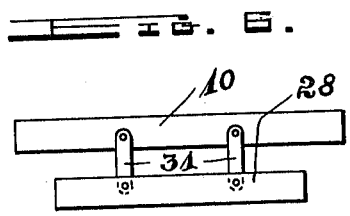
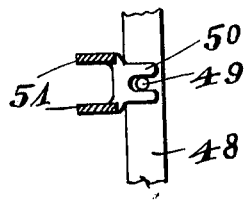
INVENTOR
Ryumatsu Sera
BY
Edward M. Kajima
ATTORNEY

UNITED STATES PATENT OFFICE.

RYUMATSU SERA, OF INDIAN WELLS, CALIFORNIA.

BEET TOPPING AND HARVESTING MACHINE.

1,314,155.  Specification of Letters Patent.  Patented Aug. 26, 1919.

Application filed June 13, 1918. Serial No. 239,813.

*To all whom it may concern:*

Be it known that I, RYUMATSU SERA, a subject of the Emperor of Japan, residing at Indian Wells, in the county of Riverside and State of California, have invented new and useful Improvements in Beet Topping and Harvesting Machines, of which the following is a specification.

This invention relates to devices for cutting off the leaves and green tops while the beets are still in the ground; and to devices for taking the beets out of the ground.

One object of the invention is to provide a device by which no unnecessary part of the beets is cut off when topping the beets.

Another object is to provide a device which will correctly cut off the top of the beets when still in the ground and easily take out the beets.

Another object is to provide a swingably suspended frame within a stationary main frame for allowing the beet-cutting and topping mechanism and the harvesting mechanism to easily move sidewise when operated by suitable levers or other operating means so as to bring the topping and harvesting mechanism always to a suitable position to meet beets which are not in perfectly straight line in the ground while the device is practically moving in a straight line over the ground with the main frame.

Another object is to provide a top equalizing roller in front of the topping mechanism.

Another object is to provide such top equalizing roller with adjusting means for changing the distance between the lowermost point of the roller and the front edge of the cutting means in vertical direction so as to cut a suitable part of the top of the beets.

Another object is to provide operating means for manually changing the distance above ground of the top equalizing roller while operated by the device over the beets in the ground.

Another object is to provide operating means for changing the position of the harvesting mechanism in relation to the depth at which the harvesting mechanism is digging through the ground for taking out the beets.

Another object is to provide operating means for the cutting and topping mechanism.

Other objects will appear from the accompanying drawing as well as from the following description and appended claims.

In the drawing—

Figure 1 is a top plan view of the device, parts of the operating means being left off to leave a clear view of the device.

Fig. 2 is a side elevation of the device.

Fig. 3 is a fragmentary top plan view of the operating means for transmitting the rotating motion of the driving or supporting wheels of the device to the cutting mechanism.

Fig. 4 is a fragmentary side elevation of the operating means of Fig. 3.

Fig. 5 is a fragmentary top plan view of the operating means for moving the swingable frame within the stationary main frame.

Fig. 6 is a fragmentary front elevation illustrating the suspension connection between the stationary main frame and the swingable frame at their front ends.

Fig. 7 is a fragmentary detail side elevation of the steering or front wheels, illustrating the steering connection between the swingable frame and the wheel yoke.

Fig. 8 is a cross section of the wheel yoke on line 8—8 of Fig. 7.

Similar numbers refer to similar parts throughout the several views.

In Fig. 1, 9 designates the driving or main supporting wheels and 10 the main or stationary frame, stationary to its position in relation to the driving or main supporting wheels. The main shaft 11 is preferably turnably mounted in the main frame 10 while the main wheels are rigidly secured to the shaft 11 thereby transmitting the rotating motion of the main wheels 9 to the shaft 11. The main frame consists besides the side-bars of the cross bar 12, the front bar 13 and the rear bar 14. The cross bar 12 is provided with the brackets 15 in which the shaft 16 is turnably mounted. The supporting arm 17 and the hand lever 18 are formed on or rigidly secured to the shaft 16. A supporting and connecting bar 19 is provided on the brackets 15 projecting toward the rear connecting through the seat frame 20 with the main frame 10. A setting bar 21 is provided on this bar 19 to hold the hand lever 18 and therewith the supporting arm 17 in a suitable position. The bar 22 is suspendedly connected to the supporting arm 17 with its upper end allowing a shifting in vertical direction through the hole in the supporting arm 17, the head 23 on the top end of the bar 22 limiting the downwardly movement. The yoke 24 of the top equalizing wheel 25 is secured to the lower end of the bar 22 thereby being supported by the supporting arm 17 in relation to the main frame 10. The yoke 24 is provided with an extension end 26 projecting toward the front, being pivotally connected at 27 to the swingable frame 28. Another extension end 29 projects from the yoke 24 toward the rear connecting with a downwardly projecting end 30 at the rear end of the swingable frame 28. The front end of the swingable frame is connected and supported by the links 31, see Figs. 1, 2 and 6, while the rear end is supported through the yoke connection and supporting lever, described above, with the main frame 10.

The vertical shifting of the bar 22 in connection with the beet-top equalizing wheel is provided to allow the wheel to pass over the tops of the beets, which are not always an equal distance above the ground over which this device moves.

The vertical shafts 32 are turnably mounted in the downwardly projecting ends 30 of the swingable frame 28, having on the lower ends the cutting wheels 33 in suitable relation to the beet top equalizing wheel 25. These cutting wheels naturally move always in upwardly direction with the beet-top equalizing wheel thereby meeting the beet, on the ground over which this device passes practically at the same point from the top downwardly on the beets.

To be able to cut off more or less from the top of the beets, an adjusting means is provided between the wheel 25 and cutting wheels 33. This adjusting means consists mainly of the termination of the rearward projecting end 29 of the yoke being provided with slots 34, and the connecting end 35 on the downwardly projecting end 30 of the swingable frame 28 being provided with an accordingly suitable number of bolts 36 whereby the distance from the lowermost point of the wheel 25 to the front edges of the cutting wheels in vertical direction can be changed or adjusted to suit the conditions of the beets in relation to their green tops, as will easily be understood.

As already stated, the swingable frame 28 is suspendedly supported through the bar 22 and the arm 17 by the main frame at its rear end, and by the links 31 at its front end.

This swinging capacity is for the purpose of bringing the top equalizing wheel 25 and the cutting wheels quickly to the tops of the beets when such are not standing in the path in which these parts would naturally move while the device is moving in a practically straight line over the ground.

The swinging and shifting movement is procured by the levers 37, which are swingably mounted on the front bar 13 of the main frame 10 at 38 and also swingably connected to the swingable frame as indicated at 39. The connection at 39 is naturally rather loose as also the connections in the links 31, having at least enough play to allow a movement in vertical direction as described above. The levers 37 are provided with the sidewise projecting arms 40, to which the rods 41 are pivotally connected at 42. A steering bar 43 is pivotally mounted on the supporting bar 19, see Fig. 2. The operation of this steering bar in connection with the rods 41 and the steering wheels through the swingable frame will be understood from the Figs. 1, 2, 5, 7 and 8. The steering bar 43 and a large part of the rods 41 as also the supporting and connecting bar 19 are not shown in Fig. 1, only for the reason not to confuse the view.

A pulling on the end 45 of the steering bar 43 and pushing on the end 44, see Fig. 5, naturally causes a drawing or pulling of one rod and a pushing of the other rod 19 bringing the arms 40 of the levers 37 to the respective positions indicated at 46 and 47, whereby the connecting ends 39 of the levers 37 move both toward the same side, as will be understood from the Fig. 5.

Such moving sidewise of the connecting ends 39, in turn, causes the swingable frame 28 to move to that side, see Figs. 1 and 2, since the connecting ends 39 are pivotally or swingably engaged with the swingable frame.

A turning or moving of the steering bar 43 in the opposite direction naturally causes a swinging of the swingable frame to the opposite direction in relation to the main frame 10, as will easily be understood.

A bar 48 is provided within the swingable frame 28, see Figs. 7 and 8, crosswise to the swingable frame 28, having an upwardly projecting pin 49. A fork-like projection 50 is provided on the yoke 51 of the steering wheels 52 engaging with the pin 49 on the cross bar 48.

A swinging of the swingable frame as described above, naturally causes a turning or steering of the steering wheels 52 through the connection of the cross bar 48 as described above.

The draw-bars 53 are pivotally connected at 54 to the swingable frame 28, see Figs. 1 and 2. To these draw-bars 53 are attached the plowshares 55, which are provided with throw-off bars 56, suitably shaped to lift the beets, plowed out of the ground by the plowshares, above the ground while the sand or soil can drop back between the bars, as will easily be understood.

The turning motion of the driving wheels 9 transmitted to the main shaft 11 is transmitted through a sprocket chain or any other suitable transmitting means 57 to the shaft 58, on which bevel gears 59 are provided to transmit the motion to the vertical shafts 32, which carry the cutting wheels 33.

To stop the turning motion of the cutting wheels while the device is in motion, operating means illustrated in Figs. 3 and 4 are provided to be substituted for the direct connection shown in Figs. 1 and 2. Operating levers 60 are swingably mounted on the shaft 11 carrying on suitably disposed free ends a short shaft 61, on which a sprocket wheel 62 is provided to engage with the sprocket wheel 63 on the main shaft 11 through the chain 64. Also secured to the short shaft 61, is a gear 65 to engage with another gear 66 provided for this construction on the shaft 58, the whole operating in the same manner as the direct drive described above, as will easily be understood.

Having thus described my invention, I claim:

1. In a device of the class described, a main frame, a swingable frame having means for vertical and horizontal swinging movement in relation to the main frame, and beet topping mechanism mounted on the swingable frame for swinging movement in such vertical and horizontal plane in relation to the main frame.

2. In a device of the class described, a main frame, a swingable frame having suspensory means connecting it to the main frame for swinging movement in relation to the main frame in a horizontal plane and having other means for swinging movement of the rear end in a vertical plane, and beet topping mechanism mounted on the swingable frame for such vertical and horizontal movement within the main frame.

3. In a device of the class described, a main frame, a swingable frame having suspensory means connecting it to the main frame for a swinging movement in a horizontal direction crosswise to the main frame and having other means allowing a swinging movement of the rear end in vertical direction in conjunction with the horizontal movement in relation to the main frame, and steering wheels turnably mounted in relation to the main frame having means engaged with the swingable frame for operating the steering wheels by the swinging movement of the swingable frame.

4. In a device of the class described, a main frame, a swingable frame having suspensory means connected to the main frame adapted for swinging movement crosswise to the main frame in a practically horizontal plane, steering wheels turnably mounted below the main frame having means connected to the swingable frame, and operating means connected to the swingable frame adapted to form the operating means for steering wheels through the swinging movement of the swingable frame.

5. In a device of the class described, a stationary frame, a swingable frame within the stationary frame suspendedly connected to the stationary frame, operating means for the swingable frame in relation to the stationary frame, steering wheels turnable within the stationary frame having means engaging with the swingable frame for operating the steering wheels by the swinging movement of the swingable frame within the stationary frame, beet-topping mechanism mounted on the swingable frame, operating mechanism provided on the stationary frame yieldingly engaging with the beet topping mechanism for manually adjusting the cut to be taken by the topping mechanism, other adjusting means within the swingable frame for setting certain cuts to be taken by the topping mechanism without the manual operating means, beet lifting plows pivotally connected to the swingable frame rearwardly of the beet topping mechanism, operating means for lifting and setting the plows, and other operating means for turning the topping mechanism within the swingable frame, all substantially as described.

In testimony whereof I hereunto affix my signature in the presence of two witnesses.

RYUMATSU SERA.

Witnesses:
G. T. UMEDA,
S. HATAYE.

Copies of this patent may be obtained for five cents each, by addressing the "Commissioner of Patents, Washington, D. C."